(12) United States Patent
Wright (10) Patent No.: US 12,538,880 B2
(45) Date of Patent: Feb. 3, 2026

(54) METHODS OF IN VITRO CULTURING SPHAGNUM

(71) Applicant: MICROPROPAGATION SERVICES (E.M.) LIMITED, Loughborough (GB)

(72) Inventor: Neal Wright, Loughborough (GB)

(73) Assignee: MICROPROPAGATION SERVICES (E.M.) LIMITED, Loughborough (GB)

( * ) Notice: Subject to any disclaimer, the term of this patent is extended or adjusted under 35 U.S.C. 154(b) by 0 days.

(21) Appl. No.: 18/038,427

(22) PCT Filed: Nov. 24, 2021

(86) PCT No.: PCT/GB2021/053045
§ 371 (c)(1),
(2) Date: May 23, 2023

(87) PCT Pub. No.: WO2022/112756
PCT Pub. Date: Jun. 2, 2022

(65) Prior Publication Data
US 2024/0008427 A1 Jan. 11, 2024

(30) Foreign Application Priority Data
Nov. 24, 2020 (GB) .................................... 2018484

(51) Int. Cl.
*A01G 22/30* (2018.01)
*A01H 11/00* (2006.01)

(52) U.S. Cl.
CPC ............. *A01G 22/30* (2018.02); *A01H 11/00* (2013.01)

(58) Field of Classification Search
CPC ........ A01G 22/30; A01H 11/00; A01H 4/002; A01H 4/005; Y02A 40/00
See application file for complete search history.

(56) References Cited

FOREIGN PATENT DOCUMENTS

| CN | 102257955 | B | * | 12/2012 | | |
|----|-----------|---|---|---------|---|---|
| CN | 103609443 | A | * | 3/2014 | | |
| CN | 103999772 | A | | 8/2014 | | |
| CN | 107896986 | A | | 4/2018 | | |
| CN | 108496779 | A | * | 9/2018 | ............. | A01G 24/10 |
| CN | 109588315 | A | | 4/2019 | | |

OTHER PUBLICATIONS

Kao et al. Nutritional Requirement for Growth of Vicia hajastana Cells and Protoplasts at a Very Low Population Density in Liquid Media, Planta (Berl.) 126, 105-110, 1975. (Year: 1975).*
Sabovljevic et al. In Vitro Culture and Secondary Metabolite Isolation in Bryophytes, Chapter 10, Methods in Molecular Biology, Protocols for In Vitro Cultures and Secondary Metabolite Analysis of Aromatic and Medicinal Plants, vol. 547, 2009, 117-127. (Year: 2009).*
Dodds et al. Experiments in Plant Tissue Culture 2nd ed., 1985, 36-36 and 210-211. (Year: 1985).*
Makinde et al. Studies of sterilization protocol development and calli induction of selected tropical mosses, Journal of Tropical Biology and Conservation 11: 33-40, 2014. (Year: 2014).*
Kao et al. Nutritional Requirement for Growth of Vicia hajastana, Cells and Protoplasts at a Very Low Population Density in Liquid Media, Plant (Berl.) 126,105-110, 1975. (Year: 1975).*
Melosik et al. In vitro propagation of selected *Sphagnum* species (section Subsecunda) Lindbergia 30: 21-31. Lund 2005, 21-31. (Year: 2005).*
Sabovljevic et al. In Vitro Culture and Secondary Metabolite Isolation in Bryophytes, Chapter 10, Methods in Molecular Biology, Protocols for In Vitro Culture and Secondary Metabolite Analysis of Aromatic and Medicinal Plants, vol. 547, 2009 117-127. (Year: 2009).*
Zhang et al. From spore germination to gametophyte development the culture, propagation and anatomical protonemal structure of Takakia lepidozioides (Bryophyta) in Tibet Plateau, Cryptogamie, Bryologie, 2016, 37 (4): 383-397. (Year: 2016).*
Google Patent translation for CN102257855B retrieved on Apr. 23, 2024, 5 pp. (Year: 2024).*
Espacenet translation CN103609443A retrieved on Feb. 20, 2025, 4 pp. (Year: 2025).*
Beike et al., "Clonal in vitro propagation of peat mosses (*Sphagnum* L.) as novel green resources for basic and applied research", Plant Cell Tiss Organ Cult, (2015), vol. 120, pp. 1037-1049.
Caporn et al., "Sphagnum restoration on degraded blanket and raised bogs in the UK using micropropagated source material: a review of progress", Mires and Peat, (2017/18), vol. 20, Article 09, ISSN 1819-754X, pp. 1-17, retrieved from the internet: URL https://dro.dur.ac.uk/26947/1/26947.pdf?DDD1+gczs25, 2018.
Duckett et al., "In vitro cultivation of bryophytes: a review of practicalities, problems, progress and promise", Journal of Bryology (2004), vol. 26, pp. 3-20, retrieved from the internet: URL: https//www.researchgate.net/publication/233595578.
Leon et al., "Effect of phosphorus and nitrogen on Sphagnum regeneration and growth: an experience from Patagonia", Wetlands Ecology Management, (2019), vol. 27, pp. 257-266, retrieved from the internet: URL https://doi.org/10.1007/s11273-019-09657-4.
Melosik et al., In vitro propagation of selected Sphagnum species (section Subsecunda), LINDBERGIA, (2005), vol. 30, No. 1, pp. 21-31, retrieved from the internet: URL https//www.jstor.org/stable/20150177.
Sobotka et al., "Regeneration and vegetative propagation of Sphagnum palustre as factor of population stability", Acta Societatis Botanicorum Poloniae, (1976), vol. XLV, No. 4, pp. 357-368, retrieved from the Internet: URL https://pbsociety.org.pl/journals/index.php/asbp/article/view/asbp.1976.031.

(Continued)

*Primary Examiner* — June Hwu
(74) *Attorney, Agent, or Firm* — MacMillan, Sobanski & Todd, LLC (57) ABSTRACT

A method for in vitro culturing *Sphagnum* is provided. The method comprises providing a vegetative fragment of *Sphagnum* and surface cleaning the fragment with alcohol. The method further comprises dissecting the fragment to provide a piece (106) of *Sphagnum*. The method further comprises initiating the piece (106) of *Sphagnum* in a culture medium (104).

19 Claims, 5 Drawing Sheets

(56) References Cited

OTHER PUBLICATIONS

Zhao et al., "Development of a method for protonema proliferation of peat moss (Sphagnum squarrosum) through regeneration analysis", New Phytologist, (2019), vol. 221, pp. 1160-1171.
PCT International Search Report and Written Opinion, Application No. PCT/GB2021/053045, dated Mar. 17, 2022, 4 pp. search report, 6 pp.
GB Patents Act 1977: Search Report under Section 17, Application No. GB2214601.3, dated Dec. 14, 2022, one page.
GB Patents Act 1977: Search Report under Section 17, Application No. GB2018484.2, dated Jan. 21, 2021, one page.

* cited by examiner

| Sample | Wet Weight /g |
|---|---|
| 1 | 82.2 |
| 2 | 15.0 |
| 3 | 61.6 |
| 4 | 58.8 |
| 5 | 87.2 |
| 6 | 65.3 |
| 7 | 74.0 |
| 8 | 49.2 |
| 9 | 69.4 |
| 10 | 32.5 |
| 11 | 75.2 |
| 12 | 54.5 |
| Average | 64.5 |
| Standard Deviation | 15.7 |

METHODS OF IN VITRO CULTURING SPHAGNUM

The present disclosure relates to *Sphagnum*, in particular to methods for in vitro culturing *Sphagnum*.

*Sphagnum* is a genus of moss. It is a lower plant, or a non-vascular plant, and is an example of a bryophyte. It is often referred to as peat moss and typically grows in the wild in peatlands or wetlands. Examples of suitable habitats for *Sphagnum* include bogs, such as raised bogs and blanket bogs, moors, mires, and fens. *Sphagnum* has a particularly high capacity for maintaining water in its hyaline cells. As such, in its natural environment, *Sphagnum* typically grows in wet conditions such as in peatlands.

Peatlands around the world are formed when lower layers of *Sphagnum* decay to form peat, while the upper layer continues to grow on the surface. As a result of this, carbon is stored within the peat while the actively-growing upper *Sphagnum* continues sequestering carbon dioxide from the atmosphere. Peatlands cover approximately 3% of the land on the Earth's surface, but store over 500 Gigatonnes of carbon—more than all other vegetation types combined. However, due to adverse impacts on the peatlands (e.g. industrial pollution, drainage—particularly for agriculture, and peat harvesting) the actively-growing upper *Sphagnum* has been eroded (or is now absent) in many peatlands, thereby exposing the peat to the atmosphere. This absence of surface *Sphagnum* enables carbon to evaporate from the peatland. This is a pressing environmental issue, and damaged peatlands now contribute around 6% of global anthropogenic carbon dioxide emissions. As a result, there is a pressing need for effective peatland restoration and methods of effectively growing *Sphagnum* for restoration purposes. Conventional methods of peatland restoration typically involve translocating *Sphagnum* from other sites including peatlands, which is clearly not sustainable.

Recently, efforts have been made to cultivate *Sphagnum* sustainably, such as through in vitro tissue culture techniques such as micropropagation. This avoids the need for harvesting large amounts of wild *Sphagnum* for cultivation. Conventional techniques rely on cultivating *Sphagnum* from spores. However, spore availability is significantly restricted for *Sphagnum* (worldwide, but especially in the UK) and the time window for spore harvesting is particularly narrow (sometimes only 2 or 3 weeks per year, if spores can be found at all). As such, obtaining spores is particularly difficult, meaning the starting material is not available for in vitro cultivation at a commercial scale.

Moreover, in vitro cultivation of vegetative parts of *Sphagnum* has been unsuccessful. *Sphagnum* is known as a particularly difficult plant to sterilise in order to remove contaminants such as bacteria and fungi. This is especially because of the high water content of *Sphagnum* in its hyaline cells, from which contaminants are difficult to remove. The resultant culture of *Sphagnum* therefore generally contains many contaminants which dominate the *Sphagnum*. In the absence of sufficient sterilisation, contaminants will overcome the *Sphagnum*, restricting growth and potentially killing the *Sphagnum*, resulting in poor growth rates and a large number of discarded cultures.

Using conventional sterilants has also proved to be ineffective in the culturing of vegetative *Sphagnum*. Sterilants that are conventionally used in micropropagation, such as chlorine or bleach, have been found to kill or significantly damage the vegetative *Sphagnum*.

The present disclosure seeks to address one or more of the above problems.

The invention is defined by the appended independent claims, while optional features are set out in the appended dependent claims.

According to a first aspect of the present disclosure, there is provided a method for in vitro culturing *Sphagnum*, comprising: providing a vegetative fragment of *Sphagnum*; surface cleaning the fragment with alcohol; dissecting the fragment to provide a piece of *Sphagnum*; and initiating the piece of *Sphagnum* in a culture medium.

Disclosed herein is a method for in vitro culturing *Sphagnum*, comprising: providing a vegetative fragment of *Sphagnum*; surface cleaning the fragment with alcohol; and initiating the fragment of *Sphagnum* in a culture medium.

Disclosed herein is a method for in vitro culturing *Sphagnum*, comprising: providing a vegetative fragment of *Sphagnum*; surface cleaning the fragment; and initiating the fragment of *Sphagnum* in a culture medium. In some examples, the method comprises surface cleaning the fragment with a cleaning composition. In some examples, the cleaning composition does not comprise bleach, and for example does not comprise chlorine such as hypochlorite. For example, the cleaning composition may comprise alcohol as described herein. In other examples, other cleaning compositions may be used. Other features of the methods of the aspects discussed below may be provided with this method.

As used herein, the term "culturing" preferably refers to maintaining the *Sphagnum* in conditions suitable for growth. In other words, the *Sphagnum* may be propagated or cultivated. For example, the *Sphagnum* may be maintained in a live state. Preferably, the culturing comprises growing the *Sphagnum*.

In vitro culturing refers to culturing *Sphagnum* under in vitro conditions. This preferably means that the *Sphagnum* is cultured under controlled laboratory conditions. Preferably, the in vitro culturing comprises clonal propagation of the *Sphagnum*. Preferably, the in vitro culturing comprises tissue culture of *Sphagnum*. Preferably, the in vitro culturing comprises micropropagation of the *Sphagnum*. The term in vitro culturing should be differentiated from in vivo cultivating. In vivo cultivation refers to growing *Sphagnum* outside of controlled laboratory conditions, such as in a greenhouse or in a field. In contrast, in vitro culturing refers to culturing under controlled laboratory conditions, preferably in a sterile or substantially sterile environment.

As used herein, the term "vegetative fragment" of *Sphagnum* refers to a part of the adult form of *Sphagnum*. In one example, the fragment is from a gametophyte of *Sphagnum*. In one example, the fragment is from a gametophore of *Sphagnum*. For example, the fragment may include parts of stems, branches, or leaves of *Sphagnum*. The fragment preferably does not include a spore of *Sphagnum*. As a fragment is used, vegetative pieces of *Sphagnum* can be used as the starting material. This avoids the need for using spores, avoiding the problems with lack of availability. Using a fragment also means that the starting material can be selected with more choice as there is more availability. For example, a specific species of *Sphagnum* and/or a particular location of origin can be selected and vegetative material can be used. This can be particularly important for restoration of peatlands, where a particular species or origin is desired to replace damaged peatlands without impacting on the ecosystem. Moreover, selection of single species allows traits or properties to be selected, such as fast growing species or species suited to particular habitats. This can be useful for *Sphagnum* farming, such as for producing biomass, for example for growing media. Biodiversity can also be improved by selecting multiple species without relying on collection of spores of each species. The availability of vegetative material compared to spores means that such selection is easier and more widely possible, even in the absence of spores.

By surface cleaning a fragment with alcohol, the inventors have found that the fragment can be sufficiently sterilised to inhibit contamination, while the alcohol does not kill the *Sphagnum*, unlike conventional sterilants such as chlorine or bleach. Instead, surface cleaning with alcohol may effectively partially sterilise the *Sphagnum*. This sufficiently cleans the *Sphagnum* to restrict or prevent growth of contaminants, without killing the *Sphagnum* during cleaning.

In one example, the surface cleaning with alcohol may involve placing the fragment into alcohol e.g. submerging the fragment in alcohol for a short period.

By providing a fragment of *Sphagnum*, rather than an entire strand or plant, a small surface area is provided, reducing the potential for contamination. The water content of the *Sphagnum* is also reduced, reducing the risk of contamination from contaminants in the water of the hyaline cells. As the fragment is surface cleaned with alcohol, it is particularly beneficial to use a fragment rather than a whole plant. This is because the alcohol will sterilise less powerfully than e.g. chlorine-based sterilants. On the one hand, this means the cleaning step is less toxic and does not kill the *Sphagnum*, but this also results in a less thorough sterilisation (e.g. compared to chlorine), meaning it is even more important to avoid contaminants in the first place. Providing a fragment allows the potential contaminants to be reduced, reducing the risk of contamination compared to using a whole plant, which would be less well sterilised by the alcohol than the fragment. Providing a fragment results in a more thorough clean when compared to cleaning a whole plant or strand with alcohol.

As used herein, a "gametophyte" preferably refers to the adult form of vegetative material, including stems, branches, and leaves, which may be the haploid stage of the life cycle of *Sphagnum*. This is to be differentiated from the sporophyte, which may be the diploid stage. Once *Sphagnum* germinates from a spore, it forms a filament chain of cells called a protonema. This protonema then differentiates into the adult form of vegetative material, sometimes referred to as the gametophore. The gametophore is the adult plant which forms the stems, branches, and leaves. The term "gametophore" thus preferably refers to vegetative material of *Sphagnum* in its adult form. The term "gametophyte" preferably includes both the protonema and the gametophore.

In vitro cultivation from a vegetative fragment results in genetically-identical progeny. This allows for the axenic cultivation of a single desired species. The resultant material is also clean compared to wild harvested *Sphagnum*. This provides a more sustainable method for propagation of *Sphagnum*, and provides more useful material as *Sphagnum* can be provided without contamination such as seeds, weeds, micro-organisms, bacteria, viruses, or fungi which may be present in wild-harvested material. This has improved biosecurity compared to translocated *Sphagnum*, avoiding ecological issues in introducing foreign organisms because the material is clean.

Dissecting of the fragment preferably means cutting the fragment to provide a piece of *Sphagnum* which is smaller than the original fragment. The dissecting is preferably performed by hand, as this has been found to be more precise than using a machine. For example, this may involve using a cutting instrument such as a scalpel or a knife. Preferably, the dissecting the fragment is performed after the surface cleaning the fragment with alcohol. Preferably, the dissecting is performed under sterile conditions, such as using a sterile cutting instrument. Preferably, the dissecting is performed on a sterile surface. For example, the dissecting may be performed in a laboratory. Air filtration systems may be used to remove contaminants from the air and optionally provide sterile air.

Dissecting should preferably be differentiated from pulverising or chopping with a machine. Dissecting preferably involves precise cuts by hand, whereas pulverising or chopping with a machine results in imprecise cuts with a lack of control over the size of the resulting pieces. It is also more difficult to sterilise the entire machine, whereas it is easier to sterilise a hand-held dissecting implement such as a scalpel. Pulverising *Sphagnum* in a machine also often breaks the *Sphagnum* into pieces which are too small, and sometimes damages the *Sphagnum*. By dissecting the fragment, the size of the resulting piece can be precisely controlled. Furthermore, the dissecting allows a single suitable piece to be selected for initiation.

In some cases, the fragment may be dissected into a plurality of pieces, which means that at least two pieces of *Sphagnum* are provided from the fragment.

By dissecting the fragment into a smaller piece, the potential for contamination is reduced because a smaller piece is initiated. This reduces the risk that the piece has contaminants on its surface or within water in its hyaline cells.

It is undesirable to provide a small piece before the surface cleaning because that small piece may become damaged by the alcohol. On the other hand, reducing the time of surface cleaning with alcohol may reduce the effectiveness of the cleaning and may leave contaminants, so it is undesirable to reduce the time too much. Therefore, it is preferable to use a fragment for the surface cleaning and then subsequently dissect the fragment into a smaller piece. This provides the advantages of using a small piece in initiation to reduce contamination risk, while ensuring that the *Sphagnum* is large enough that it is more resistant to the alcohol and has lower risk of becoming damaged or being killed during the cleaning.

As used herein, the term "initiating" should preferably be understood to mean that the piece of *Sphagnum* is placed into a culture medium for culturing therein. Successful initiation results in the piece of *Sphagnum* beginning to grow. In particular, new vegetative parts of *Sphagnum* visibly appear from the initiated piece.

The culture medium is suitable for culturing *Sphagnum*. In particular, the culture medium provides conditions suitable for growth of the piece of *Sphagnum*. For example, the culture medium may be sterile. The culture medium may be arranged in a culture vessel, such as a glass or plastic container.

In some examples, the dissecting may provide a plurality of pieces of *Sphagnum*. In such cases, more than one piece may be initiated, for example the plurality of pieces may be initiated. Each piece may be initiated in a separate culture medium in a separate culture vessel. Preferably, each culture medium contains only a single piece. This reduces the risk of contamination of each culture medium, and allows for better isolation of contamination.

Optionally, the fragment has a length of less than 10 mm. In some examples, the fragment has a length of less than 30 mm or less than 20 mm. The fragment preferably has a length of less than 5 mm. This is beneficial because the smaller the fragment, the less likely it is to contain contamination that cannot be cleaned by the alcohol. The larger the fragment, the more surface area and water contained within the hyaline cells, and therefore the higher the risk that contamination is present. It is therefore important to minimise the length of the fragment to prevent contamination. This improves the sterility of the resulting piece of *Sphagnum* dissected from the fragment.

In some examples, the fragment has a length of at least 1 mm. This ensures that the fragment is sufficiently resistant to the alcohol that it will not become damaged or be killed by the alcohol.

The larger the fragment, the more resistant to the alcohol, but as mentioned above the higher the risk that it will contain contamination. As such, an optimum is desired. In some examples, the fragment has a length of between 1 mm and 30 mm, preferably between 1 mm and 20 mm. The fragment more preferably has a length between 1 mm and 10 mm, even more preferably between 1 mm and 5 mm. This provides an optimum length which provides resistance to alcohol, while reducing risk of contamination.

In some examples, the providing the vegetative fragment of *Sphagnum* comprises providing vegetative *Sphagnum* and dissecting the *Sphagnum* in order to provide the fragment. For example, a vegetative part (such as a capitulum) of *Sphagnum* may be provided and dissected to provide a fragment for surface cleaning. The dissecting may be performed in a similar way to the dissecting of the fragment to provide the piece of *Sphagnum* following the surface cleaning. The dissecting may be performed by using a cutting instrument such as a scalpel or a knife. Preferably, the dissecting is performed under sterile conditions or substantially sterile conditions, using a sterile cutting instrument. Although the fragment will be subsequently surface cleaned, it is preferable to not introduce more contamination at this stage, and therefore this may be performed under sterile conditions. Preferably, the dissecting is performed on a sterile surface. For example, the dissecting may be performed in a laboratory. Air filtration systems may be used to remove contaminants from the air and optionally provide sterile air.

In some examples, the fragment is from a gametophore of *Sphagnum*. In some examples, the fragment is from a gametophyte of *Sphagnum*. In some examples, the fragment comprises part of a stem, a branch, or a leaf of *Sphagnum*. It is preferable that the fragment does not comprise a whole stem, branch, or leaf, and instead refers to a part thereof. This provides a small fragment, which reduces the risk of contamination.

Optionally, the fragment is from a capitulum of *Sphagnum*. The fragment may comprise a part of a capitulum. The capitulum is the top part of a strand of *Sphagnum* which contains a terminal bud with a cluster of compact juvenile branches, from where the *Sphagnum* predominantly grows. The capitulum is the most actively growing part of the *Sphagnum*, and has been found to be the most effective for initiation as the resulting culture contains fast growing branches. In other examples, the fragment may be from mature *Sphagnum*. For example, mature *Sphagnum* may be regarded as stems, leaves, or branches further down the strand of *Sphagnum*, which are typically slower growing but may be more resistant to alcohol.

In some examples, the *Sphagnum* is in vivo *Sphagnum*. This means the *Sphagnum* has previously been cultivated in vivo. In other words, the *Sphagnum* may be cultivated out of in vitro conditions, such as in a greenhouse or in a field. By growing *Sphagnum* out of laboratory conditions, the *Sphagnum* can become hardier and more resistant to environmental factors. Therefore, it is preferable to use in vivo *Sphagnum* as the starting fragment, rather than in vitro material. This also ensures the *Sphagnum* can grow well in vivo, which is important as the progeny of the in vitro culturing will be genetically identical. A fragment of the in vivo *Sphagnum* can then be provided for surface cleaning. Preferably, the *Sphagnum* is grown indoors in a greenhouse. This reduces the risk of the *Sphagnum* containing contaminants compared to growing in a field or in the wild on a peatland. In some cases, the *Sphagnum* may be grown outdoors in a field. This provides a tougher and more robust fragment which is more resistant to the alcohol, but will likely be less clean.

Optionally, the piece of *Sphagnum* has a length of less than 1 mm. In other words, the dissecting may comprise dissecting the fragment to provide the piece of *Sphagnum* having a length of less than 1 mm. This reduces the potential for contaminants on the piece of *Sphagnum*, thereby increasing the growth potential of the culture when initiated. Preferably, the piece of *Sphagnum* has a length of less than 0.5 mm, more preferably less than 0.3 mm. The fragment may be dissected to provide a piece as small as possible as seen with the naked eye. It is preferable that the piece is not too small that it inhibits differentiation into a gametophore (vegetative material). Conventionally, sometimes pulverisation using a machine is used for protoplast production, where cultivation is inhibited by repeatedly pulverising the *Sphagnum* to prevent formation of new shoots (i.e. gametophores). It has been found to be desirable to avoid this, and ensure the piece of *Sphagnum* differentiates into a gametophore as quickly as possible. As such, it is preferable that the piece of *Sphagnum* has a length of at least 0.05 mm, preferably at least 0.1 mm. In some examples, the piece of *Sphagnum* has a length of between 0.1 mm and 1 mm, preferably between 0.1 mm and 0.5 mm. Most preferably, the piece of *Sphagnum* has a length of between 0.1 mm and 0.3 mm. For example, in cases where the fragment has a length of around 1 mm, in one example the fragment is dissected to provide three pieces so that each piece has a typical length of around 0.3 mm. As the dissecting may be performed by hand, great control over the size of the fragment can be achieved, which cannot be achieved by using a chopping machine.

Optionally, the surface cleaning the fragment with alcohol is performed for less than 30 seconds. In some examples, the surface cleaning the fragment with alcohol is performed for less than one minute. By exposing the fragment to alcohol for a short period, the risk of damaging the tissue or killing the *Sphagnum* is reduced. It has been found that surface cleaning with alcohol for less than 30 seconds provides optimum cleaning without damaging the *Sphagnum*. Above 30 seconds can potentially damage the *Sphagnum*, especially if the fragment is too small. It is preferable to provide a fragment having a length of less than 10 mm in combination with surface cleaning with alcohol for less than 30 seconds. This is particularly synergistic because, for fragments of less than 10 mm (especially sized around 1 mm), more than 30 seconds can potentially damage the *Sphagnum*. For larger pieces which are more resistant, the time can be increased without damage, but that can be more difficult to remove contaminants from.

Surface cleaning for at least 10 seconds ensures that the fragment is sufficiently clean for initiation, more preferably at least 15 second. Surface cleaning for between 10 and 30 seconds is particularly preferred with providing a small fragment (e.g. less than 10 mm, preferably between 1 mm and 10 mm) because this ensures the fragment is sufficiently cleaned without killing the *Sphagnum*.

Optionally, the alcohol comprises between 50% and 80% alcohol by volume (abv). In some examples, the alcohol comprises at least 50% abv. In some examples, the alcohol comprises between 65% and 75% abv. Preferably, the alcohol comprises about 70% abv. In such cases, the remaining component may comprise (or consist of) water, such as sterile or distilled water. This provides a high enough concentration of alcohol which ensures sufficient sterilisation. 100% alcohol may be used, but providing some water can improve the cleaning process by wetting the tissue. 70% abv has been found to be the most effective alcohol, especially when using propanol. 70% abv alcohol is widely available and is cheaper than higher purity alcohols.

Optionally, the alcohol comprises propanol. In particular, the propanol may be propan-2-ol, often referred to as 2-propanol, isopropanol, or isopropyl alcohol. This is widely available and is sometimes referred to as rubbing alcohol. In other cases, the alcohol may comprise ethanol. It is preferable to use propanol in commercial settings as it is easier to procure than ethanol and is less expensive. Other alcohols may be used in other embodiments. For example, the alcohol may comprise methanol.

Optionally, the method further comprises surface cleaning the fragment with sterile water before the surface cleaning with alcohol. For example, the surface cleaning with sterile water may involve placing the fragment into water e.g. submerging the fragment in water. For example, the sterile water may be distilled water, reverse osmosis water, or other substantially pure water, that has preferably been treated to sterilise it. This washes off any large contaminants adhering to the surface of the fragment. To some degree, this can also partially replace the water within the hyaline cells with sterile water, removing unwanted contaminants. Wetting the surface of the *Sphagnum* also improves the effectiveness of the cleaning with alcohol.

Optionally, the method further comprises surface cleaning the fragment with sterile water after the surface cleaning with alcohol. For example, the surface cleaning with sterile water may involve placing the fragment into water e.g. submerging the fragment in water. For example, the sterile water may be distilled water, reverse osmosis water, or other substantially pure water, that has preferably been treated to sterilise it. This avoids the alcohol being in contact with the *Sphagnum* for a long period of time, even after the surface cleaning has finished. Alcohol may pass into hyaline cells during the surface cleaning, so cleaning with sterile water afterwards allows the sterile water to replace the alcohol, preventing damage caused by prolonged exposure. This avoids residual alcohol eventually causing damage to the *Sphagnum*. This can allow the alcohol to act for the desired amount of time, and then washing with water can remove the alcohol.

In some examples, the surface cleaning with sterile water after the surface cleaning with alcohol is performed for at least one minute. This gives enough time for the water to remove any alcohol remaining on the *Sphagnum* or in the hyaline cells.

Optionally, the method further comprises placing the piece of *Sphagnum* onto a sterile absorption surface before initiating. This step preferably occurs after the surface cleaning with alcohol and before the initiating, more preferably after the surface cleaning with water following the surface cleaning with alcohol (if this step is performed). The absorption surface is configured to absorb moisture from the *Sphagnum*, and to absorb any residual water or alcohol. In some examples, this may at least partially dry the *Sphagnum*, although it may be preferable to prevent completely drying and killing the *Sphagnum*. The absorption surface is sterile so that contamination is not introduced at this stage. Preferably, the absorption surface comprises paper or card. This is a cheap and effective surface which can easily be sterilised and is naturally absorbent. After drying, the piece of *Sphagnum* can then be placed onto the culture medium for initiation.

Optionally, the surface cleaning does not comprise using a chlorine-based sterilant. In other words, the method preferably does not comprise using a chlorine-based sterilant to sterilise the fragment. Conventionally, chlorine-based sterilants are used to sterilise spores, but these have been found to kill vegetative parts of *Sphagnum*. Therefore, it is preferable to use alcohol instead, and it is desirable to clean the fragment without using a chlorine-based sterilant. Examples of conventional chlorine-based sterilants include sodium hypochlorite, calcium hypochlorite, and sodium dichloroisocyanurate. In some examples, the surface cleaning does not comprise use of sodium hypochlorite. For example, the surface cleaning does not comprise use of sodium hypochlorite at a concentration in solution (e.g. diluted in water) of at least 1%, preferably at least 0.5%, more preferably at least 0.1%. For example, the surface cleaning may comprise surface cleaning the fragment with alcohol and without surface cleaning the fragment with a chlorine-based sterilant.

Optionally, the surface cleaning does not comprise using a detergent. In other words, the method preferably does not comprise using a detergent to sterilise the fragment. Conventionally, detergents are used to sterilise spores, but these have been found to kill vegetative parts of *Sphagnum*. Therefore, it is preferable to use alcohol instead, and it is desirable to clean the fragment without using a detergent. Examples of conventional detergents include Tween (i.e. polysorbate). For example, the surface cleaning does not comprise surface cleaning with Tween (i.e. polysorbate).

Optionally, the culture medium does not comprise sugar. Sugar is often conventionally used during in vitro culturing of *Sphagnum* to provide a carbon source for photosynthesis, promoting growth. Sugar is generally provided in the form of glucose or sucrose added to the culture medium. However, providing sugar results in ideal growth conditions for contaminants, which then tend to dominate and out-compete *Sphagnum*. This effect is particularly significant for *Sphagnum* because *Sphagnum* is adapted to grow in harsh conditions. However, where an abundance of sugar is supplied during cultivation of *Sphagnum*, it has been found to promote unwanted growth of contaminants, which can then out-compete the *Sphagnum*. As such, it has been found that providing a culture medium without sugar is advantageous as the effects of contamination can be reduced. This is particularly important as the *Sphagnum* is initiated from a vegetative piece which is cleaned with alcohol, and there is a higher risk of contamination than if a stronger sterilant such as chlorine were used. As such, it is particularly advantageous to use a culture medium without sugar where the *Sphagnum* has been surface cleaned with alcohol.

In some examples, the culture medium comprises nutrients.

In some examples, the culture medium comprises nutrients comprising nitrogen, phosphorus, potassium, calcium, magnesium, sodium, manganese, copper, zinc, sulfur, boron, iron, molybdenum, and/or chlorine. In some examples, the culture medium comprises nutrients comprising nitrogen, phosphorus, potassium, calcium, magnesium, sodium, manganese, copper, zinc, sulfur, boron, iron, molybdenum, chlorine, cobalt, and/or iodine.

Optionally, the culture medium may comprise nitrogen, phosphorus, potassium, calcium, magnesium, sodium, manganese, copper, zinc, sulfur, boron, iron, molybdenum, chlorine, cobalt, and iodine.

In some examples, the culture medium comprises at least 18.05 mg per L of nitrogen. In some examples, the culture medium comprises between 18.05 mg and 103.98 mg per L of nitrogen. Preferably, the culture medium comprises at least 40 mg per L of nitrogen. More preferably, the culture medium comprises between 40 mg and 55 mg per L of nitrogen. In some examples, the culture medium comprises less than 103.98 mg per L of nitrogen. For example, nitrogen may be present in nitrite, nitrate, and/or ammonium form. For example, nitrogen may be provided by (e.g. disodium) EDTA, (e.g. ferrous sodium) DTPA, ammonium nitrate ($NH_4NO_3$), and/or calcium nitrate ($Ca(NO_3)_2 \cdot H_2O$).

In some examples, the culture medium comprises at least 9.12 mg per L of phosphorus. In some examples, the culture medium comprises at least 10.99 mg per L of phosphorus. In some examples, the culture medium comprises between 10.99 mg and 54.02 mg per L of phosphorus. Preferably, the culture medium comprises at least 5 mg per L of phosphorus. More preferably, the culture medium comprises between 5 mg and 15 mg per L of phosphorus. For example, phosphorus may be provided by potassium (dihydrogen) phosphate ($KH_2PO_4$).

In some examples, the culture medium comprises at least 66.84 mg per L of potassium. In some examples, the culture medium comprises between 66.84 mg and 151.10 mg per L of potassium. Preferably, the culture medium comprises at least 120 mg per L of potassium. More preferably, the culture medium comprises between 120 mg and 130 mg per L of potassium. For example, potassium may be provided by potassium (dihydrogen) phosphate ($KH_2PO_4$), potassium sulfate ($K_2SO_4$), and/or potassium iodide (KI).

In some examples, the culture medium comprises at least 1.17 mg per L of calcium. In some examples, the culture medium comprises between 1.17 mg and 36.96 mg per L of calcium. Preferably, the culture medium comprises at least 25 mg per L of calcium. More preferably, the culture medium comprises between 25 mg and 35 mg per L of calcium. For example, calcium may be provided by calcium nitrate ($Ca(NO 3) 2 \cdot H_2O$) and/or calcium chloride dihydrate ($CaCl_2) \cdot 2H_2O$).

In some examples, the culture medium comprises at least 0.33 mg per L of magnesium. In some examples, the culture medium comprises between 0.33 mg and 13.17 mg per L of magnesium. Preferably, the culture medium comprises at least 5 mg per L of magnesium. More preferably, the culture medium comprises between 5 mg and 15 mg per L of magnesium. For example, magnesium may be provided by magnesium sulfate ($MgSO_4 \cdot 7H_2O$)

In some examples, the culture medium comprises at least 1.32 mg per L of sodium. In some examples, the culture medium comprises at least 2.51 mg per L of sodium. In some examples, the culture medium comprises between 2.51 mg and 53.47 mg per L of sodium. In some examples, the culture medium comprises at least 0.1 mg per L of sodium. Preferably, the culture medium comprises at least 1 mg per L of sodium. More preferably, the culture medium comprises between 1 mg and 10 mg per L of sodium. For example, sodium may be provided by disodium EDTA, (e.g. ferrous) sodium DTPA, and/or sodium molybdate ($Na_2MoO_4 \cdot 2H_2O$).

In some examples, the culture medium comprises at least 3 mg per L of manganese. In some examples, the culture medium comprises at least 5.49 mg per L of manganese. In some examples, the culture medium comprises at least 0.21 mg per L of manganese. In some examples, the culture medium comprises between 0.21 mg and 1.94 mg per L of manganese. Preferably, the culture medium comprises at least 1 mg per L of manganese. More preferably, the culture medium comprises between 1 mg and 10 mg per L of manganese. For example, manganese may be provided by manganese sulfate ($MnSO_4 \cdot 4H_2O$).

In some examples, the culture medium comprises at least 0.01 mg per L of copper. In some examples, the culture medium comprises at least 0.09 mg per L of copper. In some examples, the culture medium comprises between 0.09 mg and 0.25 mg per L of copper. Preferably, the culture medium comprises at least 0.01 mg per L of copper. More preferably, the culture medium comprises between 0.01 mg and 0.25 mg per L of copper. For example, copper may be provided by copper sulfate ($CuSO_4 \cdot 5H_2O$).

In some examples, the culture medium comprises at least 0.37 mg per L of zinc. In some examples, the culture medium comprises between 0.37 mg and 1.56 mg per L of zinc. Preferably, the culture medium comprises at least 1 mg per L of zinc. More preferably, the culture medium comprises between 1 mg and 2 mg per L of zinc. For example, zinc may be provided by zinc sulfate ($ZnSO_4 \cdot 7H_2O$).

In some examples, the culture medium comprises at least 4.30 mg per L of sulfur. In some examples, the culture medium comprises between 4.30 mg and 65.59 mg per L of sulfur. In some examples, the culture medium comprises at least 40 mg per L of sulfur. Preferably, the culture medium comprises at least 60 mg per L of sulfur. More preferably, the culture medium comprises between 60 mg and 70 mg per L of sulfur. For example, sulfur may be provided by zinc sulfate ($ZnSO_4 \cdot 7H_2O$).

In some examples, the culture medium comprises at least 0.14 mg per L of boron. In some examples, the culture medium comprises between 0.14 mg and 1.02 mg per L of boron. In some examples, the culture medium comprises at least 0.5 mg per L of boron. Preferably, the culture medium comprises at least 0.6 mg per L of boron. More preferably, the culture medium comprises between 0.6 mg and 1.5 mg per L of boron. For example, boron may be provided by boric acid ($H_3BO_3$).

In some examples, the culture medium comprises at least 0.31 mg per L of iron. In some examples, the culture medium comprises between 0.31 mg and 9.15 mg per L of iron. In some examples, the culture medium comprises at least 3 mg per L of iron. Preferably, the culture medium comprises at least 1 mg per L of iron. More preferably, the culture medium comprises between 1 mg and 10 mg per L of iron. For example, iron may be provided by ferrous sulfate ($FeSO_4 \cdot 7H_2O$) and/or ferrous (e.g. sodium) DTPA.

In some examples, the culture medium comprises at least 0.01 mg per L of molybdenum. In some examples, the culture medium comprises between 0.01 mg and 0.15 mg per L of molybdenum. Preferably, the culture medium comprises at least 0.1 mg per L of molybdenum. More preferably, the culture medium comprises between 0.1 mg and 0.15 mg per L of molybdenum. For example, molybdenum may be provided by sodium molybdate ($Na_2MoO_4 \cdot 2H_2O$).

In some examples, the culture medium comprises at least 0.16 mg per L of chlorine. In some examples, the culture medium comprises between 0.16 mg and 97.64 mg per L of chlorine. Preferably, the culture medium comprises at least 10 mg per L of chlorine. More preferably, the culture medium comprises between 10 mg and 25 mg per L of chlorine. For example, chlorine may be provided by calcium chloride dihydrate ($CaCl_2 \cdot 2H_2O$) and/or cobalt chloride ($CoCl_2 \cdot 6H_2O$).

In some examples, the culture medium comprises at least 0.006 mg per L of cobalt. In some examples, the culture medium comprises at least 0.001 mg per L of cobalt. For example, chlorine may be provided by cobalt chloride ($CoCl_2 \cdot 6H_2O$).

In some examples, the culture medium comprises at least 0.64 mg per L of iodine. In some examples, the culture medium comprises at least 0.10 mg per L of iodine. For example, chlorine may be provided by potassium iodide (KI).

In some examples, the culture medium comprises:
a) at least 18.05 mg per L of nitrogen;
b) at least 10.99 mg per L of phosphorus;
c) at least 66.84 mg per L of potassium;
d) at least 1.17 mg per L of calcium;
e) at least 0.33 mg per L of magnesium;
f) at least 2.51 mg per L of sodium;
g) at least 0.21 mg per L of manganese;
h) at least 0.09 mg per L of copper;
i) at least 0.37 mg per L of zinc;
j) at least 4.30 mg per L of sulfur;
k) at least 0.14 mg per L of boron;
l) at least 0.31 mg per L of iron;
m) at least 0.01 mg per L of molybdenum; and/or
n) at least 0.16 mg per L of chlorine.

The culture medium may further comprise at least 0.006 mg per L of cobalt and/or at least 0.64 mg per L of iodine.

In a preferred example, the culture medium comprises:
a) at least 40 mg per L of nitrogen;
b) at least 5 mg per L of phosphorus;
c) at least 120 mg per L of potassium;
d) at least 25 mg per L of calcium;
e) at least 5 mg per L of magnesium;
f) at least 1 mg per L of sodium;
g) at least 1 mg per L of manganese;
h) at least 0.01 mg per L of copper;
i) at least 1 mg per L of zinc;
j) at least 60 mg per L of sulfur;
k) at least 0.6 mg per L of boron;
l) at least 1 mg per L of iron;
m) at least 0.1 mg per L of molybdenum; and/or
n) at least 10 mg per L of chlorine.

The culture medium may further comprise at least 0.006 mg per L of cobalt and/or at least 0.64 mg per L of iodine.

In a more preferred example, the culture medium comprises:
a) between 40 mg and 55 mg per L of nitrogen;
b) between 5 mg and 15 mg per L of phosphorus;
c) between 120 mg and 130 mg per L of potassium;
d) between 25 mg and 35 mg per L of calcium;
e) between 5 mg and 15 mg per L of magnesium;
f) between 1 mg and 10 mg per L of sodium;
g) between 1 mg and 10 mg per L of manganese;
h) between 0.01 mg and 0.25 mg per L of copper;
i) between 1 mg and 2 mg per L of zinc;
j) between 60 mg and 70 mg per L of sulfur;
k) between 0.6 mg and 1.5 mg per L of boron;
l) between 1 mg and 10 mg per L of iron;
m) between 0.1 mg and 0.15 mg per L of molybdenum; and/or
n) between 10 mg and 25 mg per L of chlorine.

The culture medium may further comprise at least 0.006 mg per L of cobalt and/or at least 0.64 mg per L of iodine.

Because the fragment is surface cleaned with alcohol and the fragment is dissected into a smaller piece of *Sphagnum*, a culture medium with relatively high nutrient content can be used. By mitigating contamination risk by using alcohol and keeping the piece of *Sphagnum* small, higher nutrient levels can be used, which permits faster growth. In the absence of sufficient sterilisation, this would result in worse growth rates as the high levels of nutrients would cause contaminants to thrive and out-compete the *Sphagnum*. It is particularly advantageous to clean a small fragment of *Sphagnum* (e.g. between 1 mm and 10 mm) with alcohol and initiate a small piece (e.g. less than 1 mm), and subsequently use a culture medium with high nutrient levels, because this can lead to improved growth without leading to increased contamination. It has also been found that when *Sphagnum* can be grown substantially axenically, high nutrient levels promote growth. Conventional methods provide little or no nutrients to *Sphagnum* as it is widely understood that *Sphagnum* grows in environments with little or no nutrient supply. However, by surface cleaning with alcohol to remove contamination, growth of *Sphagnum* can be improved by supplying with high levels of nutrients.

It will be appreciated that the above nutrients may be provided in a nutrient composition for in vitro cultivation of *Sphagnum* independently from the method of the first aspect. For example, features of the nutrients described here in relation to the first aspect may be applied to the third, to seventh aspects.

In some examples, the culture medium does not comprise plant hormones.

Optionally, the culture medium is a solid culture medium. For example, the culture medium may contain a solidifying agent such as agar to solidify the medium. In other examples, the culture medium is a liquid culture medium. It is preferable to initiate the fragment on a solid medium because this allows for better isolation of contaminants. This allows for easier identification of contamination and allows non-contaminated portions of the *Sphagnum* to be removed. In a liquid culture medium, if contamination were left, it would spread, and the entire culture vessel and all the *Sphagnum* would be contaminated.

The culture medium may be arranged in a culture vessel. For example, the culture vessel may be in the form of a jar, such as a glass jar. Glass jars are often used in tissue culture, and can easily be sterilised such as by autoclaving. For example, the culture vessel may have a volume of around 300 ml. In other examples, culture vessels of other materials may be used, such as plastic. The culture vessel may have a lid for inserting and removing the culture medium and the *Sphagnum*.

Optionally, the method further comprises culturing the piece of *Sphagnum* in the culture medium. Preferably, the culturing comprises growing the *Sphagnum*. Once initiated, the *Sphagnum* can be cultured to begin to form a shoot and grow. By culturing the *Sphagnum*, the *Sphagnum* can be left to grow. Culturing may involve supplying light for growth of the *Sphagnum*. For example, light may be provided by white fluorescent tubes or LEDs. Preferably, a light source provides at least 50 µmol m$^{-2}$ s$^{-1}$ photosynthetically active radiation (PAR) (i.e. wavelength of 400 to 700 nm), and more preferably between 50 µmol m$^{-2}$ s$^{-1}$ PAR and 110 µmol m$^{-2}$ s$^{-1}$ PAR.

Optionally, the culturing is performed for at least 8 weeks. This provides enough time to ensure that a new shoot will grow, and that the *Sphagnum* will grow into a differentiated adult form. For example, during this time the *Sphagnum* may be left in the culture medium. The culture medium therefore preferably contains enough nutrient supply for around 8 weeks. In some examples, the culturing is performed for at least 1 week, preferably at least 2 weeks, more preferably at least 4 weeks, even more preferably at least 6 weeks, most preferably at least 8 weeks. In some examples, the culturing may be performed for several months to ensure sufficient growth and to establish that the culture is clean.

Optionally, the culturing is performed to form a gametophore. In other words, the culturing may be performed until a gametophore is formed. For example, this may be in the form of a new shoot. In other words, the initiated piece of *Sphagnum* is cultured until the adult vegetative form is provided. The gametophore should preferably be distinguished from the protonema or protoplast. For example, the culturing may be performed until new stems, branches, or leaves are formed. In some examples, the culturing is performed continuously until the formation of a gametophore. This means that culturing does not cease, and that the *Sphagnum* is left in the culture medium until formation of a gametophore and/or for at least 8 weeks. Preferably, the *Sphagnum* is not chopped or pulverised after initiation until formation of a gametophore and/or for at least 8 weeks. In some examples, the culturing comprises culturing the fragment in the same culture medium until formation of the gametophore and/or for at least 8 weeks.

Optionally, the culturing is performed without pulverising the *Sphagnum*. Pulverising *Sphagnum* using a machine is sometimes conventionally used to maintain *Sphagnum* in the protonema stage or for production of protoplasts. Pulverising prevents the differentiation into the gametophore. This is used to build up density of protonema, but delays differentiation. It has been found to be preferable that the *Sphagnum* is not maintained in the protonema stage, and that differentiation into gametophore occurs rapidly. Therefore, it is desirable to avoid pulverisation. In other words, the initiated *Sphagnum* is preferably cultured until a gametophore is formed, without pulverising the *Sphagnum*. Preferably, culturing is performed for at least 8 weeks, without pulverising the *Sphagnum*.

Optionally, the method further comprises, after the culturing, transferring the *Sphagnum* to a second culture medium. For example, the second culture medium may be arranged in a second culture vessel. The second culture vessel may be separate to the first culture vessel (i.e. the culture vessel in which the *Sphagnum* was initiated). The second culture vessel may be the similar to the first culture vessel. For example, the second culture medium may be a container such as a glass jar.

Transferring the *Sphagnum* to a second culture medium allows the nutrient supply to be replenished. Preferably, the culturing is performed for around 8 to 12 weeks after initiation, and then the *Sphagnum* is transferred to a second culture medium. This provides an ideal time for transfer after substantial growth has occurred and when the nutrient supply is beginning to deplete. After this time, it is also possible to observe any visual signs of contamination. Therefore, it can be ensured that the culture is clean before transfer into a liquid medium, for example.

In some examples, the method further comprises determining if visible contamination is present, and if contamination is not visible, then transferring the *Sphagnum* to the second culture medium. Contamination may be visible in the culture medium or on the *Sphagnum* at this stage (preferably around 8 to 12 weeks). If the *Sphagnum* appears clean, it can be transferred to a second culture medium. This can be done under sterile conditions.

If contamination is visible, then the *Sphagnum* can be discarded if the contamination is significant and covers the whole *Sphagnum*. If the contamination is visible but does not cover all the *Sphagnum*, or is limited to a small area of the culture medium, then a small part of the non-contaminated *Sphagnum* can be taken (e.g. dissected) and used for initiation. In some examples, this may involve performing the surface sterilising steps again. This is why is it particularly useful to use a solid culture medium, because contamination can be easily identified and isolated.

Optionally, the second culture medium does not comprise sugar. As set out above, it is preferable to avoid sugar in the culture medium to avoid growth of contaminants.

Optionally, the second culture medium comprises a liquid culture medium. After the culturing in the first culture medium, any contaminants will generally be visible after that period, allowing for the selection of clean cultures and the discarding of contaminated cultures. As contamination has been identified at this stage, the second culture vessel can contain a liquid culture medium. Solid media is not required at this stage because any contamination has usually previously been identified. Using a liquid culture medium is advantageous because supply of nutrients can be increased by supplying over the entire surface area of the *Sphagnum*, whereas nutrient supply is limited with solid media. This can lead to improved growth rates for the culture period after transfer to the second culture vessel with liquid media. The improved growth rates are also more significant now that the *Sphagnum* is a larger size, as the effect on growth rate in the initial culture phase would be far less significant as the initiated piece is so small.

In some examples, the second culture medium comprises nutrients. The nutrients of the second culture medium may be the same as the first culture medium as set out above.

Optionally, the second culture medium comprises nutrients comprising nitrogen, phosphorus, potassium, calcium, magnesium, sodium, manganese, copper, zinc, sulfur, boron, iron, molybdenum, chlorine, cobalt, and iodine.

In some examples, the second culture medium contain the same composition as the first culture medium, but is preferably liquid instead of solid. For example, the second culture medium may contain the same nutrients, and optionally the same levels of those nutrients. In other examples, the second culture medium may contain other nutrients or different levels of nutrients to the first culture medium in which the fragment is initiated.

Optionally, the method further comprises culturing the *Sphagnum* in the second culture medium. For example, the *Sphagnum* may be cultured in a similar way as the culturing in the first culture medium. Culturing may involve supplying light for growth of the *Sphagnum*. For example, light may be provided by white fluorescent tubes or LEDs. Preferably, a light source provides at least 50 µmol m$^{-2}$ s$^{-1}$ photosynthetically active radiation (PAR) (i.e. wavelength of 400 to 700 nm), and more preferably between 50 µmol m$^{-2}$ s$^{-1}$ PAR and 110 µmol m$^{-2}$ s$^{-1}$ PAR.

Optionally, the culturing the gametophore in the second culture medium comprises supplying carbon dioxide. Carbon dioxide can be provided as a carbon source for photosynthesis. It is preferable to supply carbon dioxide instead of sugar because of the risk of encouraging contaminant growth. Typically, carbon dioxide is not required during the first culture in the first culture medium because the piece of *Sphagnum* is so small. After transfer to the second culture medium, it is beneficial to supply carbon dioxide for faster growth. This is particularly synergistic with using alcohol as a surface cleaner because where alcohol is used it is undesirable to use sugar because contaminant growth is encouraged. Using carbon dioxide provides a supply of carbon without encouraging contaminant growth. In some examples, the method comprises supplying a gas comprising at least 1% carbon dioxide by volume, preferably at least 5%, more preferably at least 50%, even more preferably at least 75%, still more preferably at least 90%. The gas may be supplied to the first and/or second culture vessel, such as during culturing.

In some examples, the first and/or second culture vessel comprises a barrier permeable to carbon dioxide. This can be used to sterilise carbon dioxide as the gas diffuses through the barrier and blocks contaminant. In some examples, the second culture vessel comprises a tube permeable to carbon dioxide arranged to loop into and out of holes in the second culture vessel. The second culture vessel is therefore sealed with a section of permeable tube passing through the airspace above the liquid culture media. For example, the tube may be made from silicone rubber. Carbon dioxide (e.g. at least 1% carbon dioxide by volume, preferably at least 50%, more preferably at least 90%) may be delivered through the tube from a source of carbon dioxide, which can diffuse through the wall of the permeable tube and into the second culture vessel. This allows supply of carbon dioxide while the permeable tube provides a barrier to prevent ingress of contamination. For example, the tube may be permeable to carbon dioxide but impermeable to larger particles such as contaminants. In cases where the second culture vessel contains a liquid culture medium, carbon dioxide levels in the airspace above the liquid culture medium can rise, and carbon dioxide can diffuse into the liquid medium and supply the *Sphagnum*. The liquid culture medium can be stirred to improve uptake, such as by a heat source to provide a convection current. For example, a light source, such as a fluorescent tube, may provide such a stirring effect.

In some examples, the *Sphagnum* may be transferred to a third culture medium. For example, the *Sphagnum* may be sub-divided and split up into a plurality of culture vessels. This also allows for the bulking up of *Sphagnum*. This avoids limitations on the growth of *Sphagnum*, and encourages new growth for the *Sphagnum* in each culture medium, which is particularly beneficial in a commercial growing situation. The *Sphagnum* may be cultured in the second culture medium for around 8 to 12 weeks and then transferred to a third culture medium. In 8 to 12 weeks, the *Sphagnum* typically increases weight by around four times compared to the initial *Sphagnum* in the culture vessel. For example, after 8 to 12 weeks *Sphagnum* in a 2 L culture vessel may be sub-divided into four 2 L culture vessels and the process may be repeated. After a further 8 to 12 weeks, the *Sphagnum* may be sub-divided again and so on.

During sub-dividing, the *Sphagnum* can be broken up or torn, preferably under sterile conditions. This not only permits the bulking up of *Sphagnum*, but also breaks stems to generate new growing points, leading to faster growth. For example, the *Sphagnum* may be chopped. This allows the growth rate of the *Sphagnum* to be improved because it can be chopped into a plurality of fragments. When *Sphagnum* grows as a strand, the top of the strand forms a capitulum which is the primary growing point of the *Sphagnum*. In vitro *Sphagnum* typically grows as a long strand without significant branches. However, when the strand is broken up into a plurality of fragments, each fragment will then form a growing point at the tip.

Each of these fragments therefore provides an individual growing point, resulting in faster growth than the original single strand.

According to a second aspect of the present disclosure, there is provided *Sphagnum* obtainable by the method as disclosed herein.

According to a third aspect of the present disclosure, there is provided a nutrient composition for in vitro cultivation of *Sphagnum* comprising nutrients. For example, the nutrients may comprise the nutrients disclosed herein.

In some examples, the nutrient composition comprises nitrogen, phosphorus, potassium, calcium, magnesium, sodium, manganese, copper, zinc, sulfur, boron, iron, molybdenum, and/or chlorine.

In some examples, the nutrient composition comprises nitrogen, phosphorus, potassium, calcium, magnesium, sodium, manganese, copper, zinc, sulfur, boron, iron, molybdenum, chlorine, cobalt, and/or iodine.

In some examples, the nutrient composition comprises at least 0.025 mg per L of sodium, preferably at least 0.1 mg, more preferably at least 1 mg per L of sodium.

In some examples, the nutrient composition comprises at least 0.005 mg per L of copper, preferably at least 0.01 mg per L of copper, more preferably at least 0.015 mg per L of copper.

In some examples, the nutrient composition comprises:
a) at least 18.05 mg per L of nitrogen;
b) at least 10.99 mg per L of phosphorus;
c) at least 66.84 mg per L of potassium;
d) at least 1.17 mg per L of calcium;
e) at least 0.33 mg per L of magnesium;
f) at least 2.51 mg per L of sodium;
g) at least 0.21 mg per L of manganese;
h) at least 0.09 mg per L of copper;
i) at least 0.37 mg per L of zinc;
j) at least 4.30 mg per L of sulfur;
k) at least 0.14 mg per L of boron;
l) at least 0.31 mg per L of iron;
m) at least 0.01 mg per L of molybdenum; and/or
n) at least 0.16 mg per L of chlorine.

In a preferred example, the nutrient composition comprises:
a) at least 40 mg per L of nitrogen;
b) at least 5 mg per L of phosphorus;
c) at least 120 mg per L of potassium;
d) at least 25 mg per L of calcium;
e) at least 5 mg per L of magnesium;
f) at least 1 mg per L of sodium;
g) at least 1 mg per L of manganese;
h) at least 0.01 mg per L of copper;
i) at least 1 mg per L of zinc;
j) at least 60 mg per L of sulfur;
k) at least 0.6 mg per L of boron;
l) at least 1 mg per L of iron;
m) at least 0.1 mg per L of molybdenum; and/or
n) at least 10 mg per L of chlorine.

In a more preferred example, the nutrient composition comprises:
a) between 40 mg and 55 mg per L of nitrogen;
b) between 5 mg and 15 mg per L of phosphorus;
c) between 120 mg and 130 mg per L of potassium;
d) between 25 mg and 35 mg per L of calcium;
e) between 5 mg and 15 mg per L of magnesium;
f) between 1 mg and 10 mg per L of sodium;
g) between 1 mg and 10 mg per L of manganese;
h) between 0.01 mg and 0.25 mg per L of copper;
i) between 1 mg and 2 mg per L of zinc;
j) between 60 mg and 70 mg per L of sulfur;
k) between 0.6 mg and 1.5 mg per L of boron;
l) between 1 mg and 10 mg per L of iron;

m) between 0.1 mg and 0.15 mg per L of molybdenum; and/or n) between 10 mg and 25 mf per L of chlorine.

In any of the above examples, the nutrient composition may further comprise at least 0.006 mg per L of cobalt and/or at least 0.64 mg per L of iodine.

*Sphagnum* is conventionally cultured with little or no nutrients. Even in conventional in vitro culturing *Sphagnum*, it is typical to provide very low nutrient content. The present inventors have surprisingly found that *Sphagnum* can be cultured in vitro in the presence of a relatively high concentration of nutrients. Growth rates can be improved by supplying such high levels of nutrients. This is particularly beneficial where the culture of *Sphagnum* is substantially sterile, and contamination has been avoided. Therefore, it is particularly advantageous to use the nutrient composition in combination with surface cleaning with alcohol such as described herein in relation to the first aspect.

According to a fourth aspect of the present disclosure, there is provided a nutrient medium comprising the nutrient composition of the third aspect.

In some examples, the nutrient medium may comprise a liquid medium. In some examples, the nutrient medium may comprise a solid medium. For example, the solid medium may be solidified with a solidifying agent such as agar. Nutrients and levels thereof of the first or third aspect may readily be applied to the fourth aspect.

According to a fifth aspect of the present disclosure, there is provided a method for in vitro culturing *Sphagnum*, comprising: culturing *Sphagnum* in the nutrient medium of the fourth aspect. Nutrients and levels thereof of the first or third aspect may readily be applied to the fifth aspect.

According to a sixth aspect of the present disclosure, there is provided use of the nutrient composition of the third aspect for in vitro culturing *Sphagnum*. Nutrients and levels thereof of the first or third aspect may readily be applied to the sixth aspect.

According to a seventh aspect of the present disclosure, there is provided use of the nutrient medium of the fourth aspect for in vitro culturing *Sphagnum*. Nutrients and levels thereof of the first or third aspect may readily be applied to the seventh aspect.

According to an eighth aspect of the present disclosure, there is provided a method for in vitro culturing *Sphagnum*, comprising: providing a vegetative fragment of *Sphagnum*; surface cleaning the fragment with alcohol; initiating the fragment of *Sphagnum* in a culture medium; and culturing the fragment. In some examples, the culturing is performed for at least 4 weeks, preferably at least 6 weeks, more preferably at least 8 weeks. Preferably, during the culturing, the *Sphagnum* is not pulverised (or, for example, otherwise cut or chopped). Preferably, the culturing is performed to produce a gametophore of *Sphagnum* (or gametophyte, or adult vegetative *Sphagnum*). In other words, the culturing is not performed to produce protoplasts or keep the *Sphagnum* at the protonema stage (e.g. by pulverising). This provides a rapid growth of the fragment to produce vegetative *Sphagnum*. Features of other aspects may be applied to this aspect. For example, features of the method of the first aspect may be applied to the eighth aspect.

Any suitable *Sphagnum* species (or optionally a combination thereof) may be used in the present disclosure. As different species of *Sphagnum* may have different growth requirements, the *Sphagnum* species for use in the present disclosure may be selected depending on the environment.

The *Sphagnum* may comprise one or more *Sphagnum* species. Any species could be used, but in one example the present disclosure comprises the use of one or more *Sphagnum* species selected from the group consisting of: *Sphagnum angustifolium, Sphagnum australe, Sphagnum capillifolium, Sphagnum centrale, Sphagnum compactum, Sphagnum cuspidatum, Sphagnum denticulatum, Sphagnum fallax, Sphagnum fimbriatum, Sphagnum fuscum, Sphagnum imbricatum* (*austinii*), *Sphagnum inundatum, Sphagnum magellanicum* (medium), *Sphagnum palustre, Sphagnum papillosum, Sphagnum pulchrum, Sphagnum russowii, Sphagnum squarrosum, Sphagnum subnitens, Sphagnum tenellum*, and *Sphagnum cristatum*. In one example, the method comprises the use of one or more *Sphagnum* species selected from the group consisting of: *Sphagnum palustre, Sphagnum capillifolium, Sphagnum capillifolium rubellum, Sphagnum subnitens, Sphagnum denticulatum, Sphagnum squarrosum, Sphagnum faHax, Sphagnum fimbriatum, Sphagnum cuspidatum, Sphagnum magellanicum*, and *Sphagnum papillosum*. In one example, the invention comprises the use of one or more *Sphagnum* species selected from the group consisting of: *Sphagnum palustre, Sphagnum capillifolium, Sphagnum capillifolium rubellum, Sphagnum subnitens, Sphagnum squarrosum, Sphagnum magellanicum*, and *Sphagnum papillosum*.

In one example, a *Sphagnum* species for use in the present disclosure may be one or more selected from the group consisting of: *Sphagnum palustre, Sphagnum capillifolium, Sphagnum faHax, Sphagnum magellanicum, Sphagnum papillosum*, and *Sphagnum squarrosum*.

Most preferably the *Sphagnum* species is *Sphagnum palustre*. For example, *Sphagnum palustre* may be preferable for use in a growing medium because of its physical properties.

It is also envisaged that the invention could be applied to any hybrid *Sphagnum* species.

In some examples, the fragment of *Sphagnum* comprises at least one of the *Sphagnum* species disclosed herein. In some examples, the fragment of *Sphagnum* comprises at least 2, 3, 4, 5 or more *Sphagnum* species.

Features of one aspect can be readily applied to other aspects. Apparatus features can be readily applied to method features and vice versa.

Embodiments of the disclosure are described below, by way of example only, with reference to the accompanying Figures.

EXAMPLES

Example 1

Materials and Methods

A trial was conducted involving taking a fragment from a capitulum of in vivo *Sphagnum*. The fragment was surface cleaned with 70% abv propanol for 30 seconds. The fragment was then washed in sterile water for 1 minute and placed to dry on sterile absorbing paper. The fragment was then dissected by hand using a scalpel under sterile conditions to provide a piece of *Sphagnum*. The piece had a length less than 1 mm and was placed into a culture medium for initiation. The initiated *Sphagnum* on the culture medium is shown in the photograph of FIG. 1.

Figure 1:
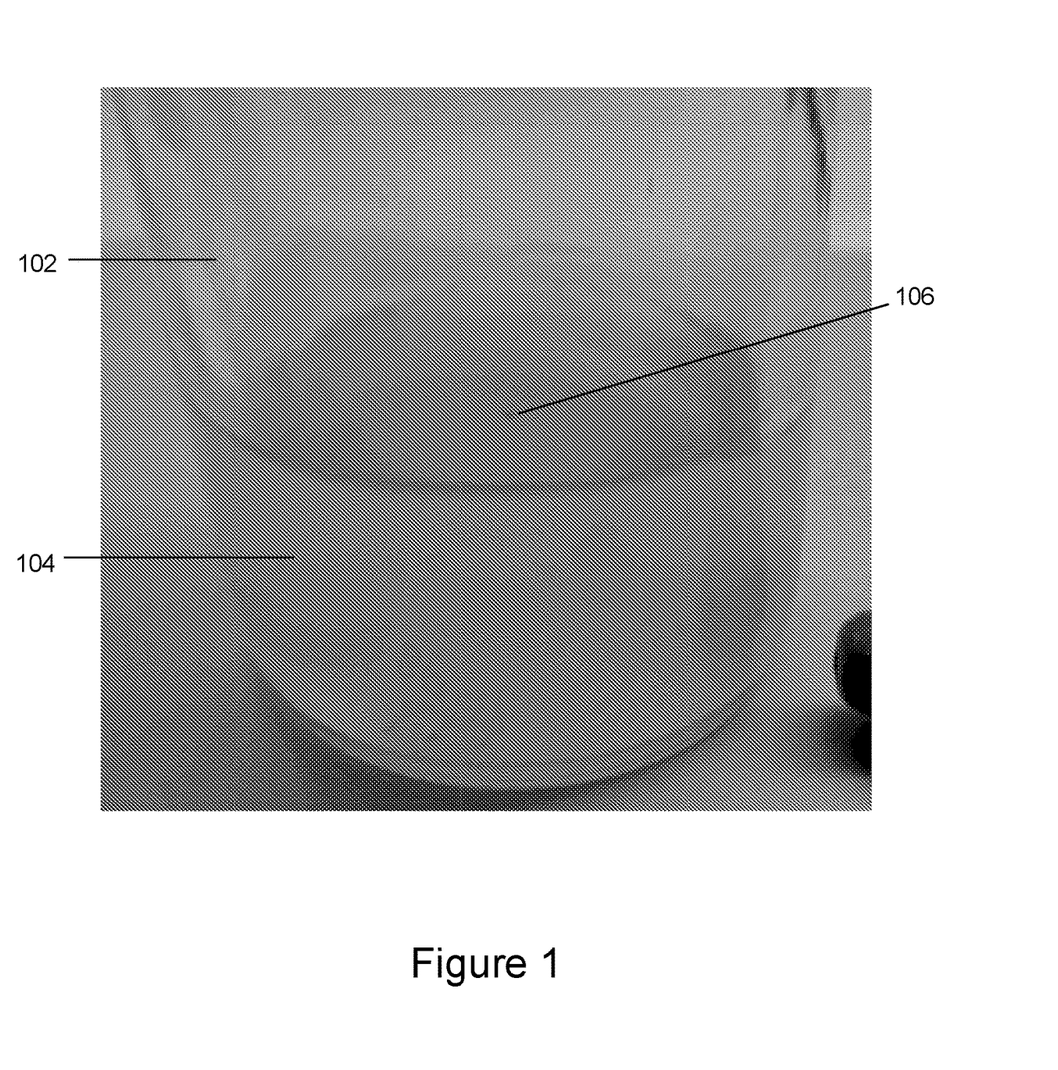
FIG. 1 shows a photograph from the side of a culture vessel for in vitro culturing *Sphagnum* according to a first embodiment of the disclosure.

Referring to FIG. 1, a photograph of an apparatus 100 for culturing *Sphagnum* is shown as used for the present trial. The apparatus 100 comprises a culture vessel 102 in the form of a glass jar of a volume of around 300 ml. The culture vessel 102 contains a culture medium 104. A piece of *Sphagnum* 106 is shown arranged on the culture medium 104.

The culture medium 104 contained nutrients comprising 48.23 mg per L of nitrogen, 9.67 mg per L of phosphorus, 123.46 mg per L of potassium, 32.63 mg per L of calcium, 9.12 mg per L of magnesium, 1.32 mg per L of sodium, 5.49 mg per L of manganese, 0.02 mg per L of copper, 1.96 mg per L of zinc, 62.55 mg per L of sulfur, 1.08 mg per L of boron, 1.40 mg per L of iron, mg per L of molybdenum, 11.69 mg per L of chlorine, 0.006 mg per L of cobalt, and 0.63 mg per L of iodine. The culture medium 104 was a solid culture medium solidified with agar. There was no sugar in the culture medium 104.

The *Sphagnum* was then cultured for 16 weeks.

Results

Figure 2:
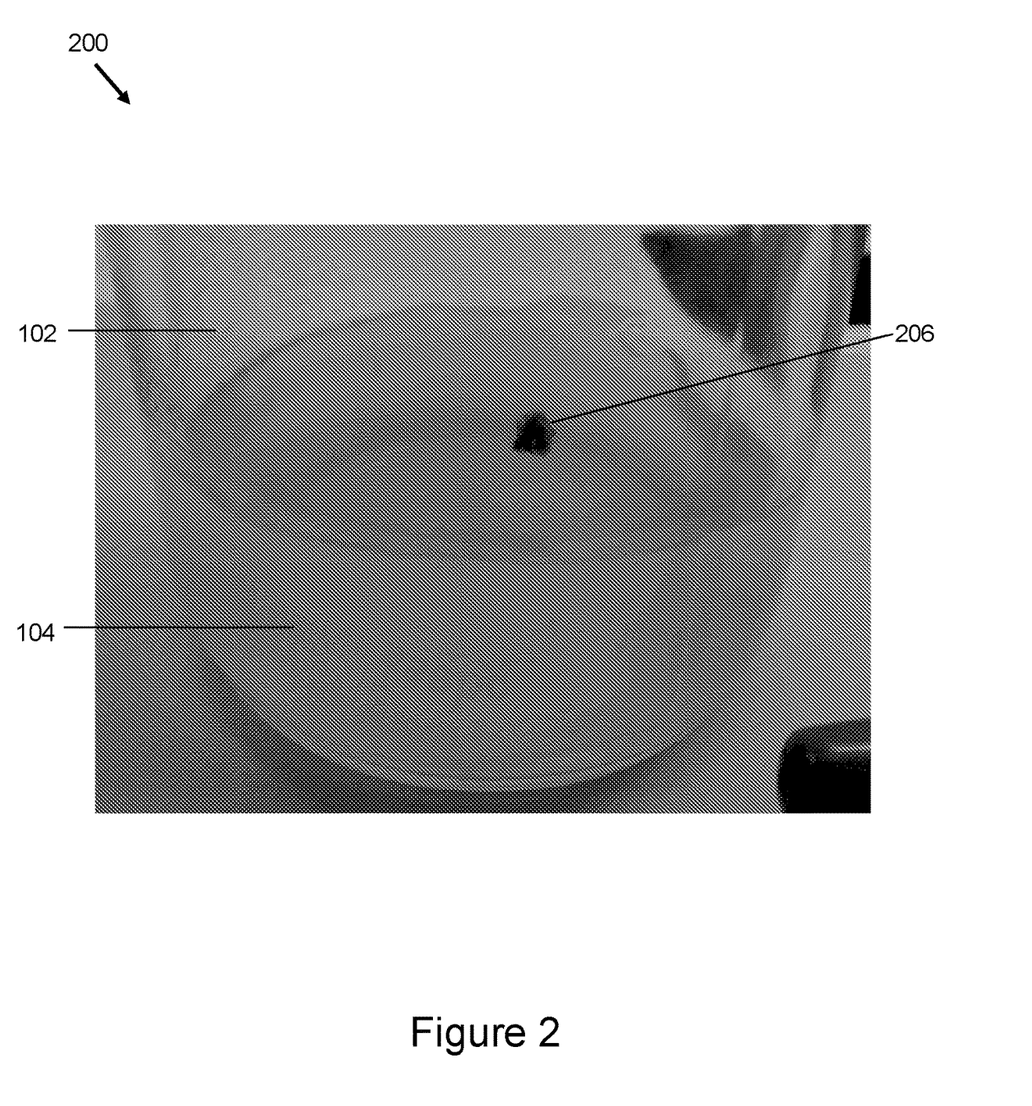
FIG. 2 shows a photograph from the side of a culture vessel for in vitro culturing *Sphagnum* of FIG. 1, after 6 weeks of growth.

FIG. 2 shows an apparatus 200 which corresponds to the apparatus 100 of FIG. 1 after a period of 6 weeks. During this time, the *Sphagnum* 106 has been cultured, and as shown in FIG. 2 the resultant *Sphagnum* 206 has grown in size.

Figure 3:
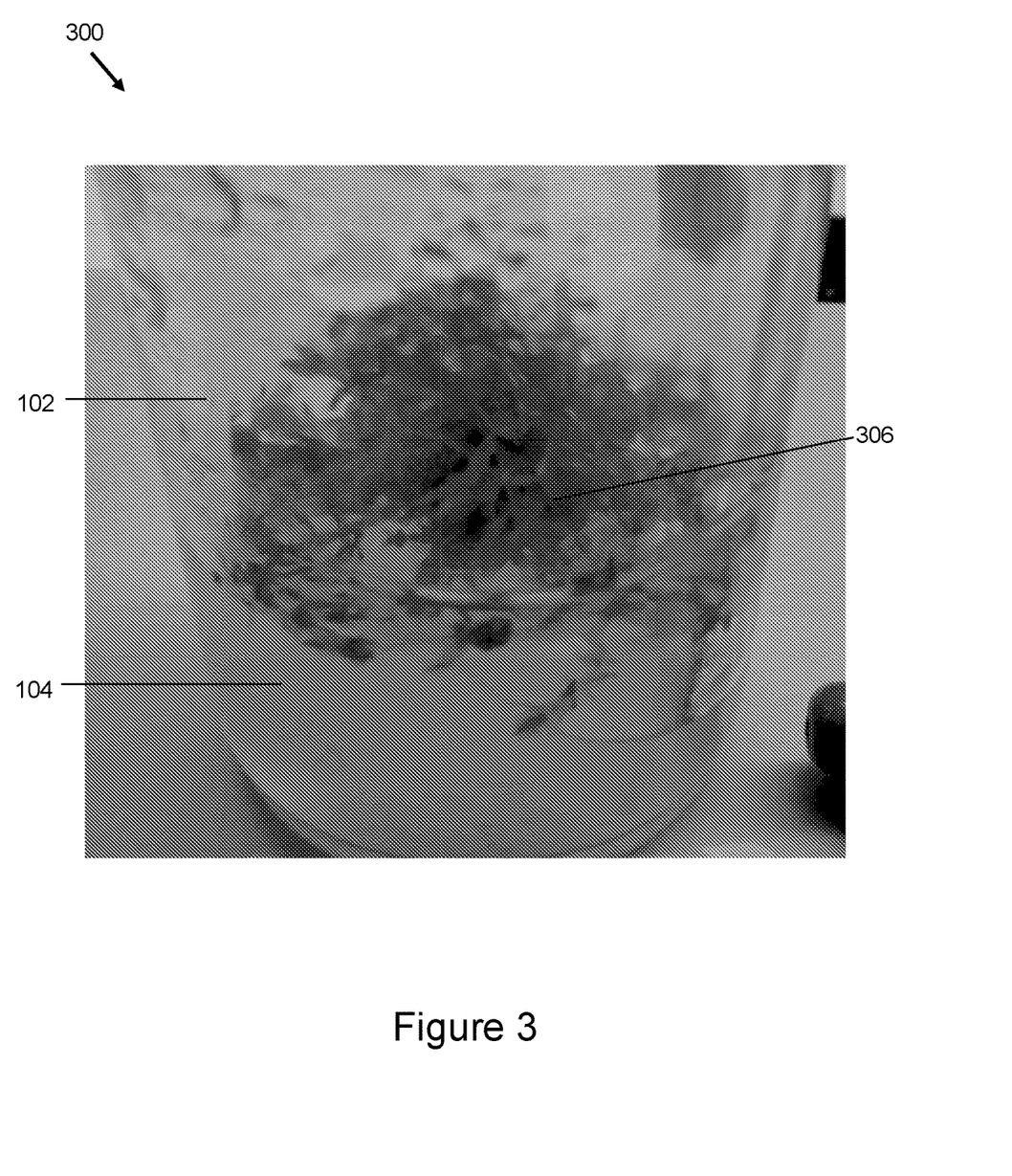
FIG. 3 shows a photograph from the side of a culture vessel for in vitro culturing *Sphagnum* of FIG. 1, after 16 weeks of growth.

FIG. 3 shows an apparatus 300 which corresponds to the apparatus 200 of FIG. 2 after a further period of 10 weeks (being 16 weeks after the apparatus 100 of FIG. 1). The *Sphagnum* 306 in FIG. 3 has significantly grown in size between FIG. 1 and FIG. 2.

This shows that the in vitro culturing techniques of surface cleaning with alcohol have been successful and contamination has been avoided.

Example 2

Materials and Methods

A trial was conducted involving taking initial samples of *Sphagnum* originally initiated following surface cleaning with alcohol and subsequently grown under in vitro conditions, in accordance with the present disclosure, such as in Example 1.

12 samples of *Sphagnum palustre* were taken with a wet weight of 13 g±1 g. The samples were then placed into a culture medium containing nutrients. The culture medium contained nutrients comprising 48.23 mg per L of nitrogen, 9.67 mg per L of phosphorus, 123.46 mg per L of potassium, 32.63 mg per L of calcium, 9.12 mg per L of magnesium, 1.32 mg per L of sodium, 5.49 mg per L of manganese, 0.02 mg per L of copper, 1.96 mg per L of zinc, 62.55 mg per L of sulfur, 1.08 mg per L of boron, 1.40 mg per L of iron, 0.10 mg per L of molybdenum, 11.69 mg per L of chlorine, 0.006 mg per L of cobalt, and 0.63 mg per L of iodine. The culture medium was a solid culture medium solidified with agar. There was no sugar in the culture medium.

The *Sphagnum* was then cultured for 10 weeks. After 10 weeks, the wet weights of the samples were measured.

Results

Figure 4:
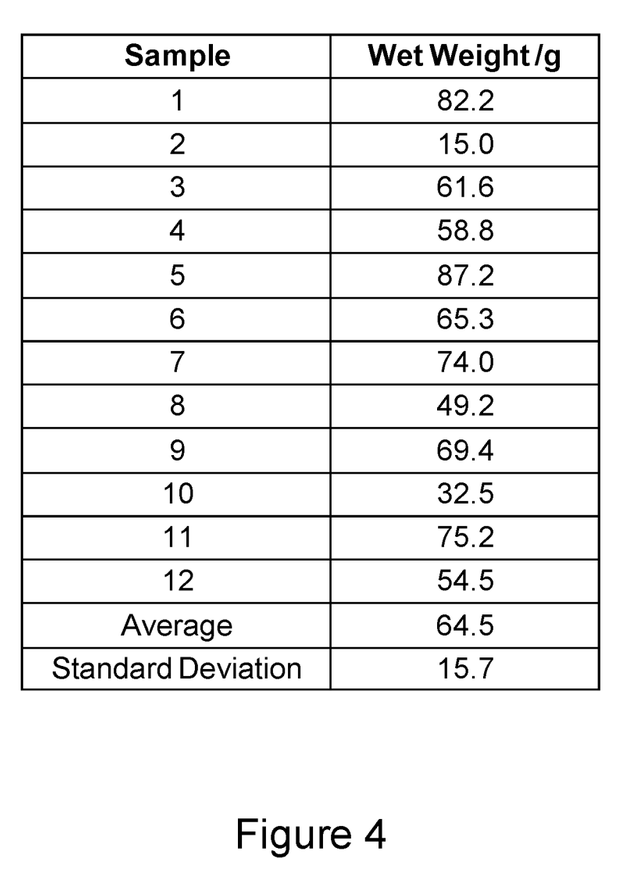
FIG. 4 shows a table of measured wet weights of samples of *Sphagnum* after 10 weeks of growth.

FIG. 4 shows a table of the final wet weights of the samples.

The mean weight of the 12 samples was 60.4 mg, with a standard deviation of 20.7 mg. This provided a percentage increase in weight of 365% as a result of 10 weeks of growth.

Sample 2 was identified as an anomaly as it did not grow well during the trial and showed poor growth compared to the other samples and was deemed non-viable.

Removing sample 2 from the results, the mean weight of the 11 remaining samples was 64.5 mg, with a standard deviation of 15.7 mg. This provided a percentage increase in weight of 396% as a result of 10 weeks of growth.

Figure 5:
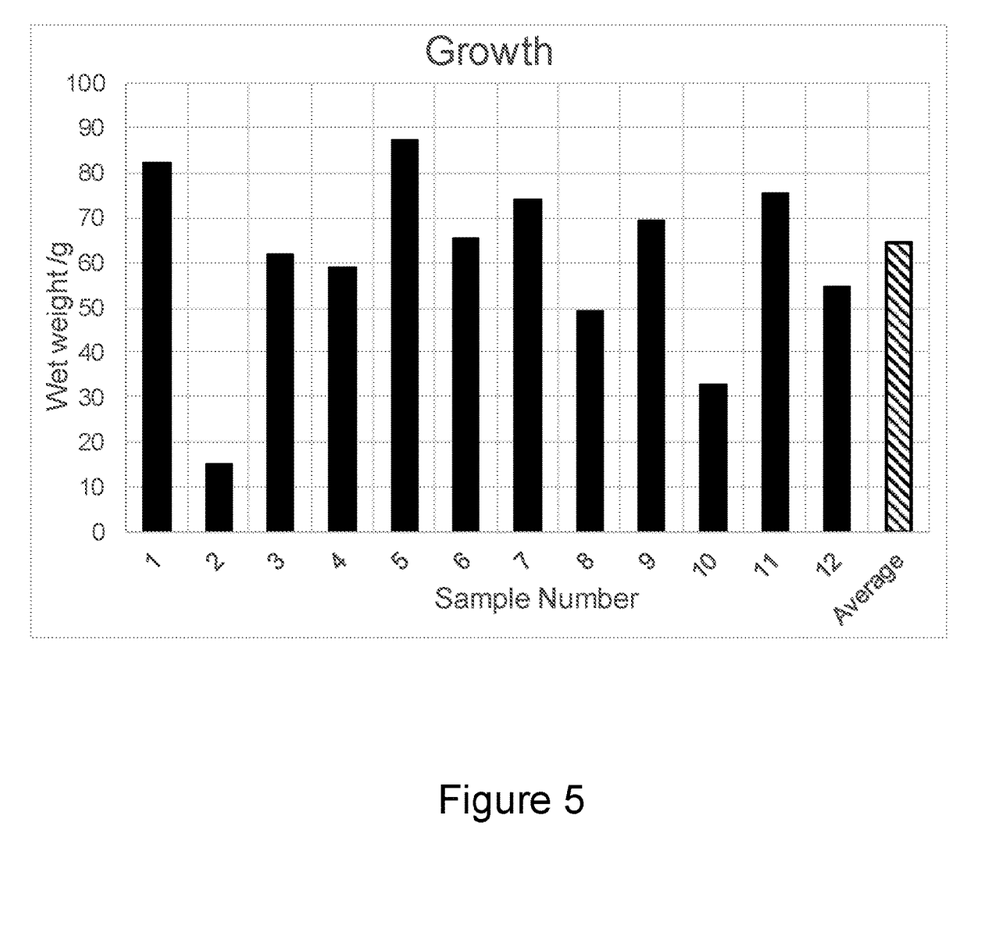
FIG. 5 shows a graph of measured wet weights of the results in the table of FIG. 4.

FIG. 5 shows a graph of the final wet weights of the samples, with sample 2 omitted from the calculation of the average.

This shows that the in vitro culturing techniques of surface cleaning with alcohol have been successful and contamination has been avoided.

The invention claimed is:

1. A method for in vitro culturing *Sphagnum*, comprising:
   providing a vegetative *Sphagnum*;
   dissecting the vegatative *Sphagnum* to provide a vegetative fragment of *Sphagnum* having a length of at least 1 mm;
   after the dissecting the vegetative *Sphagnum* to provide the vegetative fragment, surface cleaning the vegetative fragment with alcohol;
   after the surface cleaning the vegetative fragment with alcohol, dissecting the vegetative fragment to provide a piece of *Sphagnum* having a length of less than 1 mm; and
   initiating the piece of *Sphagnum* in a culture medium.

2. The method according to claim 1, wherein the vegetative fragment has a length of less than 10 mm.

3. The method according to claim 1, wherein the vegetative fragment is from a capitulum of *Sphagnum*.

4. The method according to claim 1, wherein the surface cleaning the vegetative fragment with alcohol is performed for less than 30 seconds.

5. The method according to claim 1, wherein the alcohol comprises between 50% and 80% alcohol by volume.

6. The method according to claim 1, wherein the alcohol comprises propanol.

7. The method according to claim 1, further comprising surface cleaning the vegetative fragment with sterile water before the surface cleaning the vegetative fragment with alcohol.

8. The method according to claim 1, further comprising surface cleaning the fragment with sterile water after the surface cleaning the fragment with alcohol.

9. The method according to claim 1, further comprising placing the piece of *Sphagnum* onto a sterile absorption surface before the initiating the piece of *Sphagnum* in a culture medium.

10. The method according to claim 1, wherein the surface cleaning the vegetative fragment with alcohol does not comprise using a detergent.

11. The method according to claim 1, wherein the surface cleaning the vegetative fragment with alcohol does not comprise using a detergent.

12. The method according to claim 1, wherein the culture medium does not comprise sugar.

13. The method according to claim 1, wherein the culture medium comprises nutrients comprising nitrogen, phosphorus, potassium, calcium, magnesium, sodium, manganese, copper, zinc, sulfur, boron, iron, molybdenum, chlorine, cobalt, and iodine.

14. The method according to claim 1, wherein the culture medium is a solid culture medium.

15. The method according to claim 1, further comprising culturing the piece of *Sphagnum* in the culture medium.

16. The method according to claim 15, wherein the culturing the piece of *Sphagnum* in the culture medium is performed for at least 8 weeks.

17. The method according to claim 15, wherein the culturing the piece of *Sphagnum* in the culture medium is performed to form a gametophore.

18. The method according to claim 15, further comprising, after the culturing the piece of *Sphagnum* in the culture medium, transferring the piece of *Sphagnum* to a second culture medium.

19. The method according to claim 18, wherein the second culture medium comprises a liquid culture medium.

\* \* \* \* \*